United States Patent [19]

Hogan

[11] Patent Number: 4,513,885
[45] Date of Patent: Apr. 30, 1985

[54] DISPENSER HAVING A FLEXIBLE FLUID CONTAINER AND A ROTOR COMPRESSIBLE FLUID DISCHARGE TUBE

[75] Inventor: Lawrence R. Hogan, Lake Villa, Ill.

[73] Assignee: Cole-Parmer Instrument Company, Chicago, Ill.

[21] Appl. No.: 427,504

[22] Filed: Sep. 29, 1982

Related U.S. Application Data

[63] Continuation of Ser. No. 35,817, May 4, 1979, abandoned.

[51] Int. Cl.³ .............................................. F04B 43/12
[52] U.S. Cl. ...................................... 222/95; 222/105; 222/183; 222/185; 222/214; 222/325; 222/380; 222/383
[58] Field of Search ................................. 222/95–96, 222/100, 105, 181, 183–185, 207, 209–210, 212, 214, 325, 131, 380, 383, 522, 527–529, 537

[56] References Cited

U.S. PATENT DOCUMENTS

| | | | |
|---|---|---|---|
| 315,667 | 4/1885 | Serdinko | 417/475 |
| 419,461 | 1/1890 | Lee | 417/477 |
| 2,668,637 | 2/1954 | Gilmore | 222/95 |
| 2,909,125 | 10/1959 | Daniels | 222/214 X |
| 3,011,684 | 12/1961 | Corneil | 222/214 |
| 3,223,117 | 12/1965 | Curie et al. | 222/522 X |
| 3,343,719 | 9/1967 | Kastamo et al. | 222/105 X |
| 3,384,080 | 5/1968 | Muller | 222/214 X |
| 3,402,673 | 9/1968 | Ballentine et al. | 417/477 |
| 3,684,408 | 8/1972 | Maclin | 222/214 X |
| 3,877,609 | 4/1975 | Cullis | 222/214 X |
| 4,037,817 | 7/1977 | Chernak | 251/7 |
| 4,044,989 | 8/1977 | Basel et al. | 251/7 |
| 4,044,990 | 8/1977 | Summerfield | 251/8 |
| 4,130,224 | 12/1978 | Norman et al. | 222/214 X |
| 4,214,681 | 7/1980 | Levine | 222/214 |
| 4,232,828 | 11/1980 | Shelly, Jr. | 222/214 X |
| 4,257,538 | 3/1981 | Fowler | 222/181 |
| 4,271,988 | 6/1981 | Clausen | 222/214 |

FOREIGN PATENT DOCUMENTS

| | | | |
|---|---|---|---|
| 503003 | 5/1954 | Canada | 222/214 |
| 2845423 | 4/1979 | Fed. Rep. of Germany | 222/214 |
| 444557 | 12/1934 | United Kingdom | 222/103 |

Primary Examiner—Charles A. Marmor
Attorney, Agent, or Firm—Fitch, Even, Tabin & Flannery

[57] ABSTRACT

A dispensing system is disclosed which finds particular application as a sanitary food dispensing system, and which includes a support stand adapted to releasably support at least one portable modular dispenser housing in which is mounted a flexible fluid impervious container having a flowable food product contained in sealed relation therein and to which a compressible flow tube is affixed having a discharge fitment thereon facilitating removal of product from the container. A rotor is mounted within the dispenser housing for cooperation with the compressible flow tube to enable controlled portion dispensing of product from the discharge fitment through actuation of an external operating handle.

20 Claims, 22 Drawing Figures

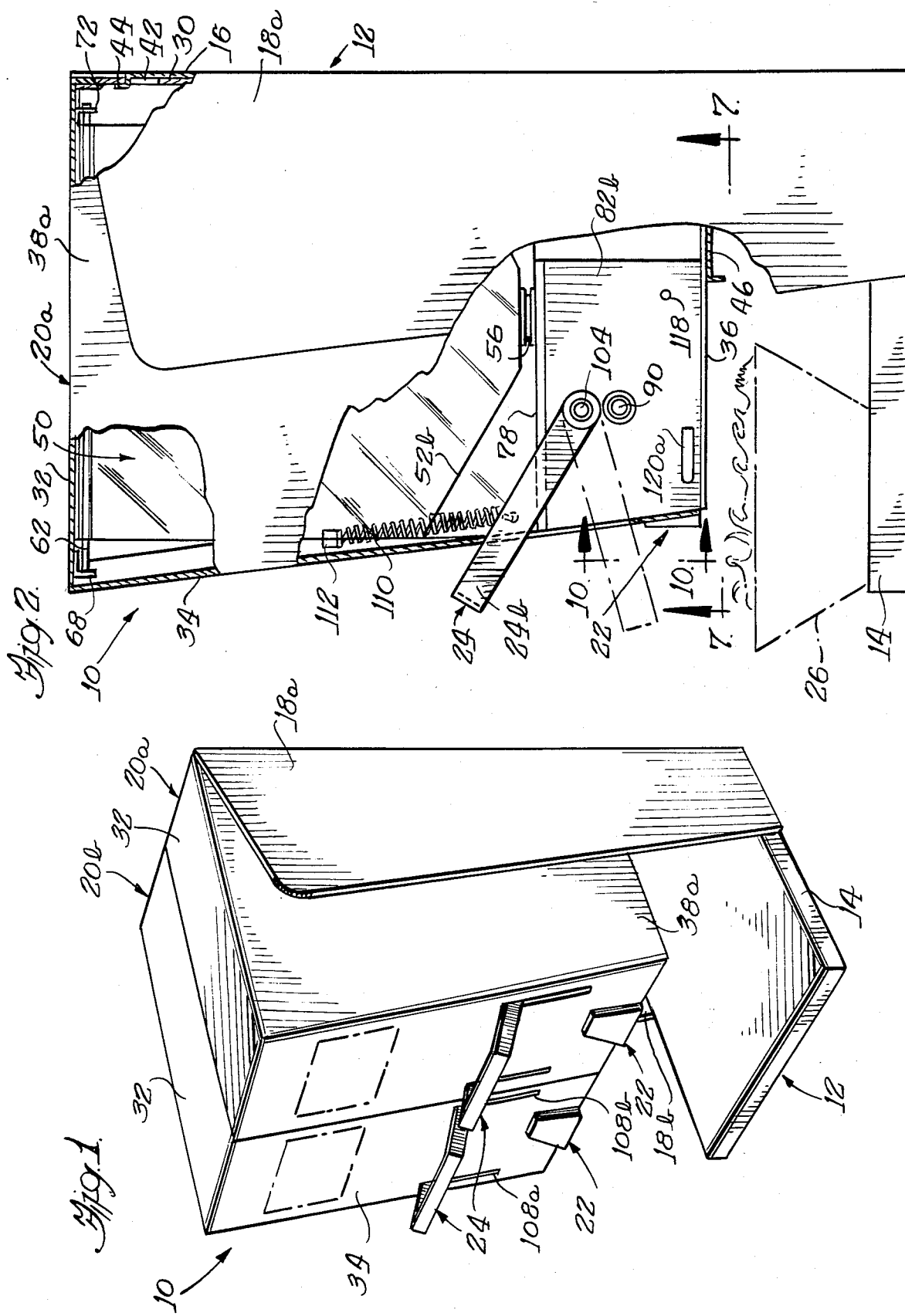

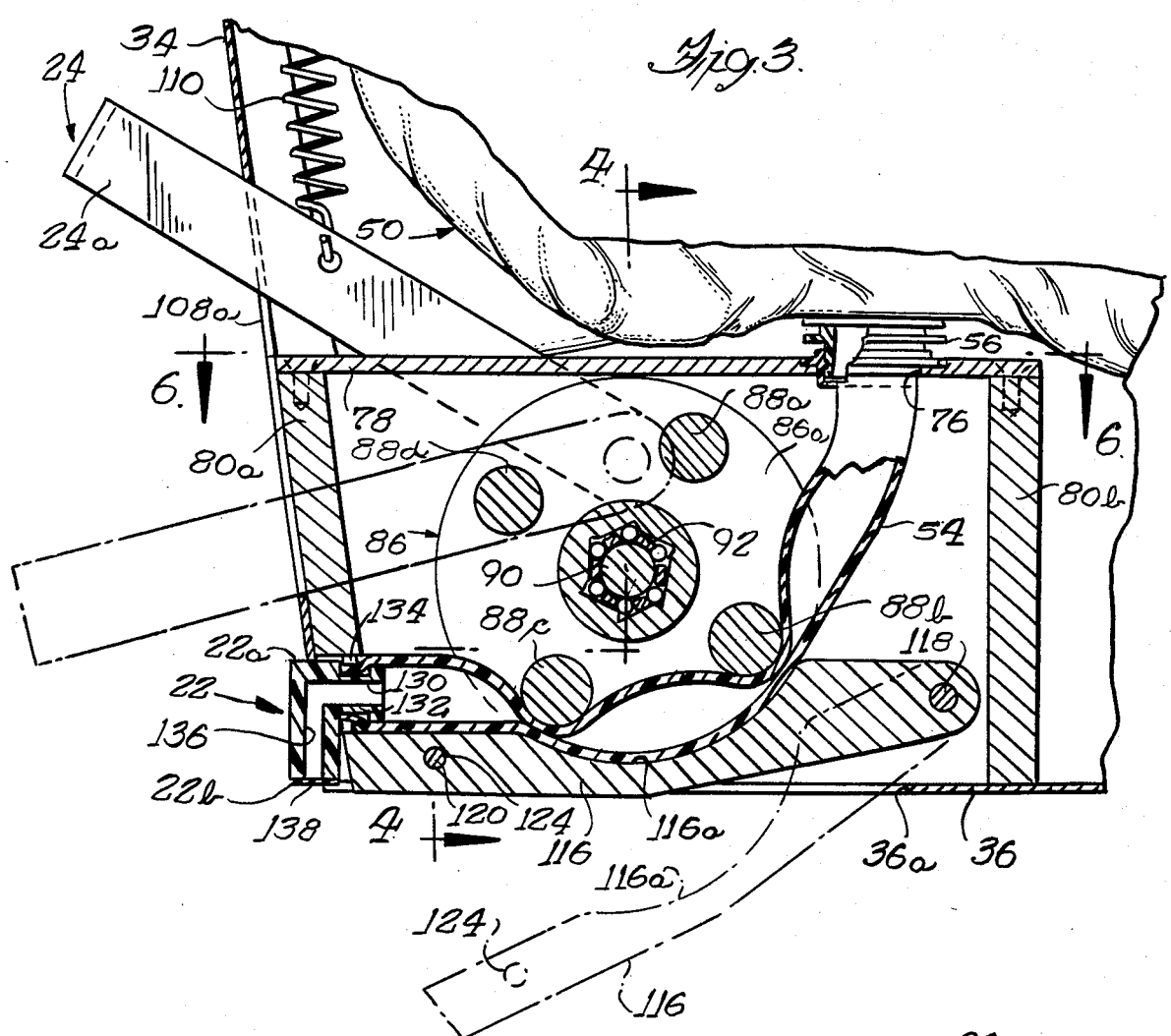
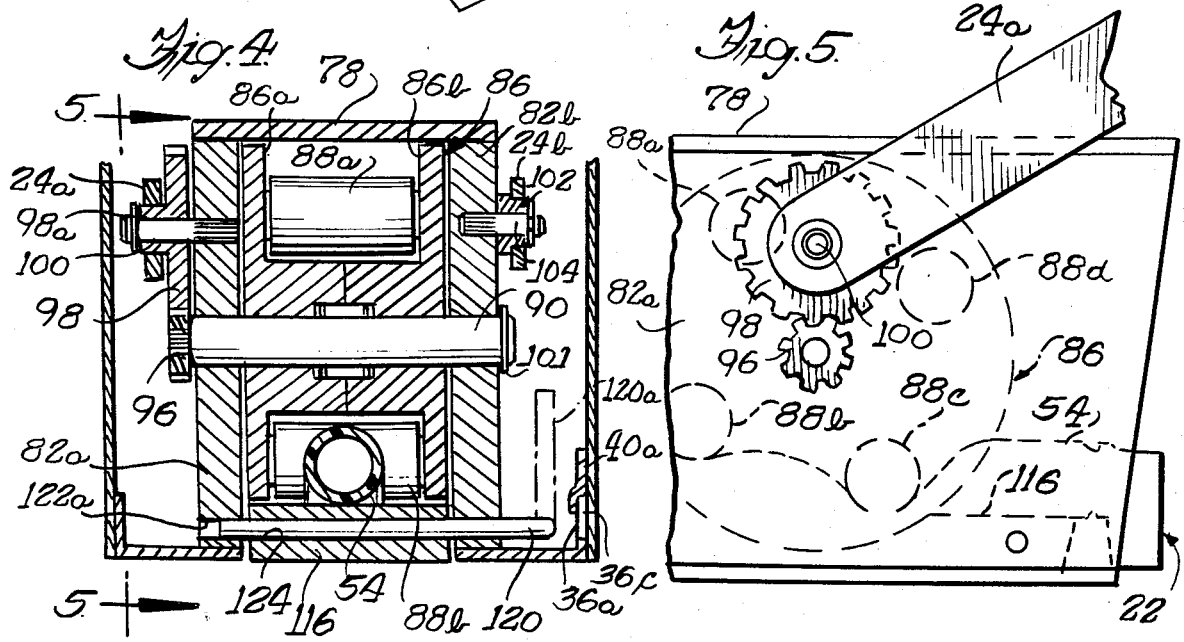

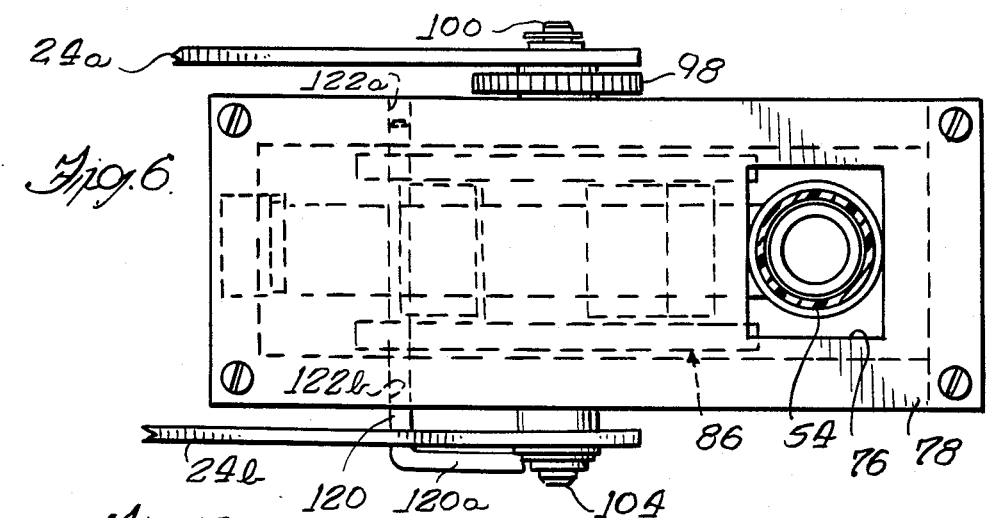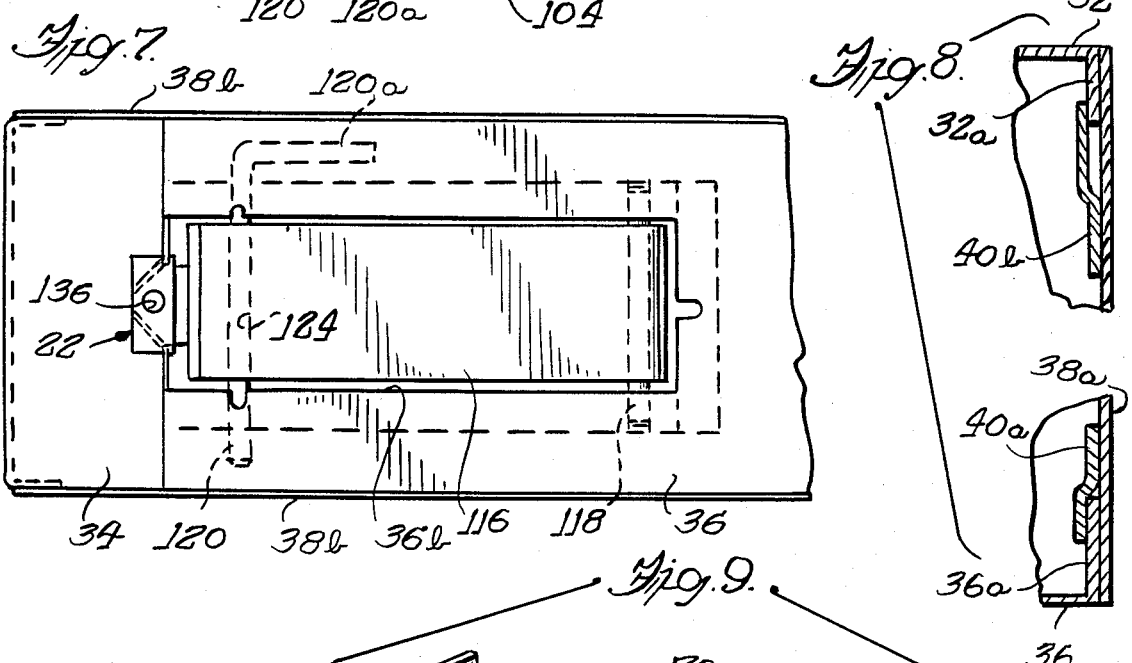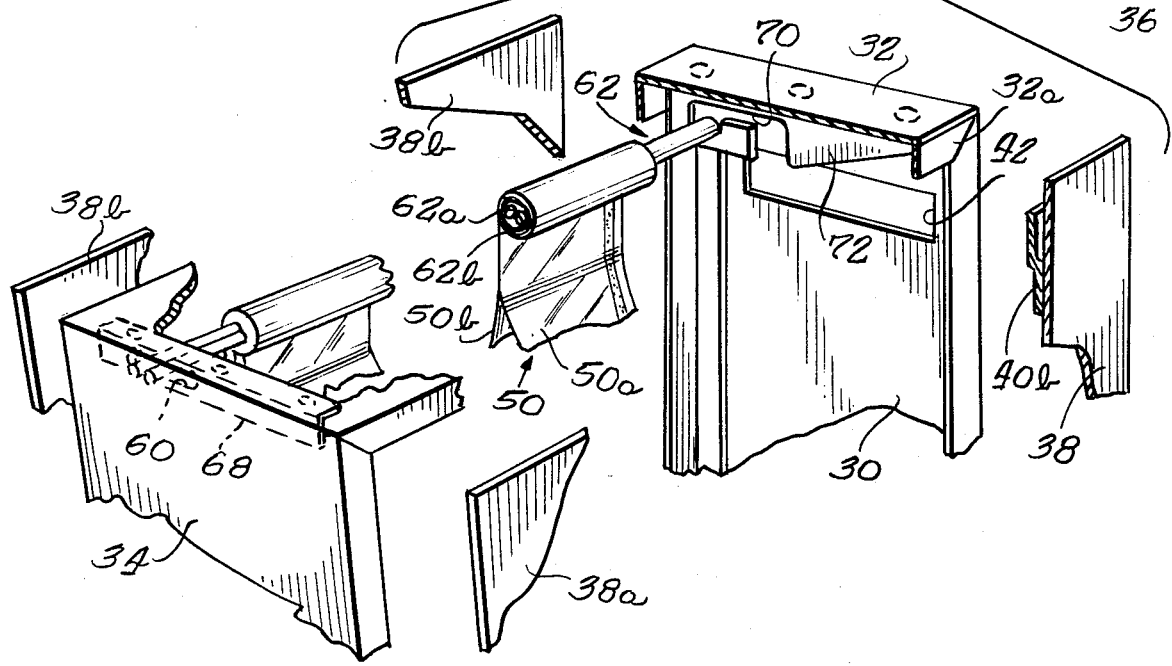

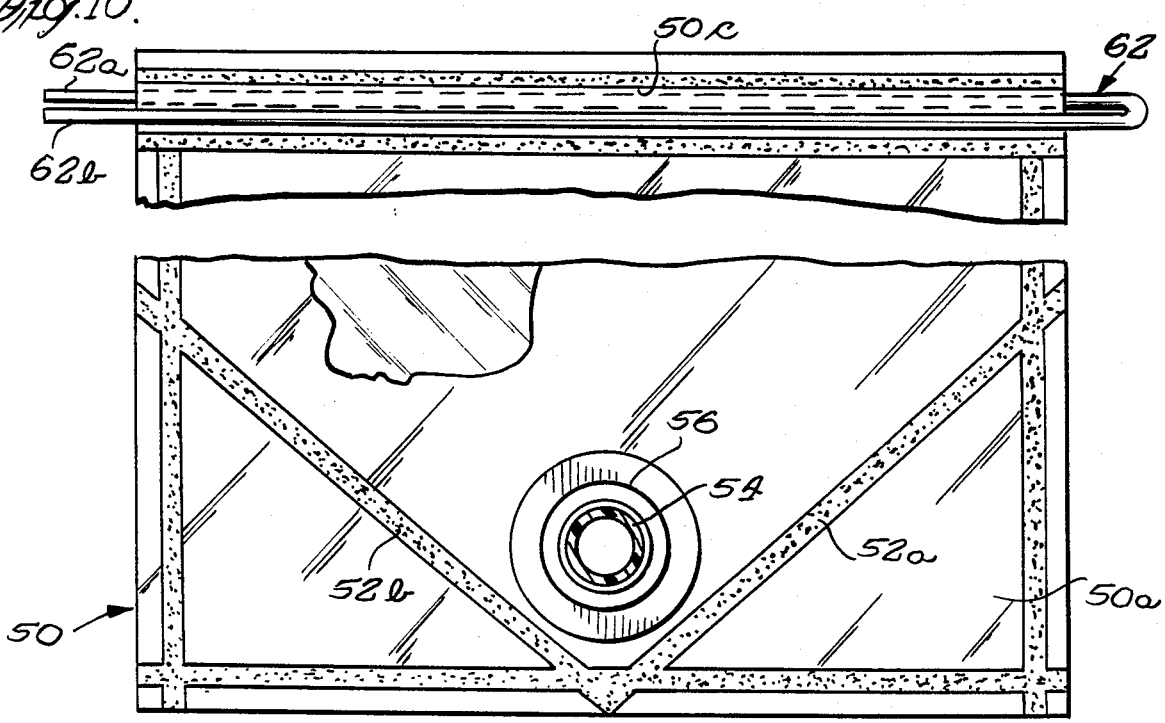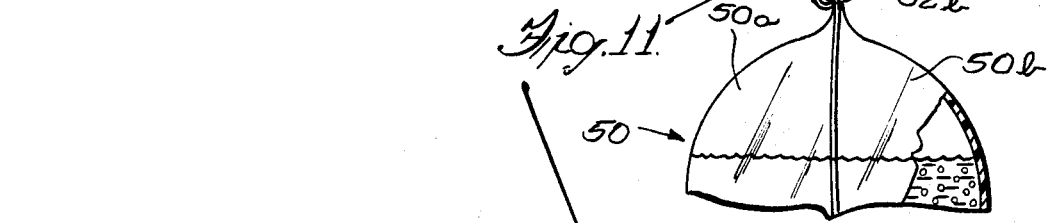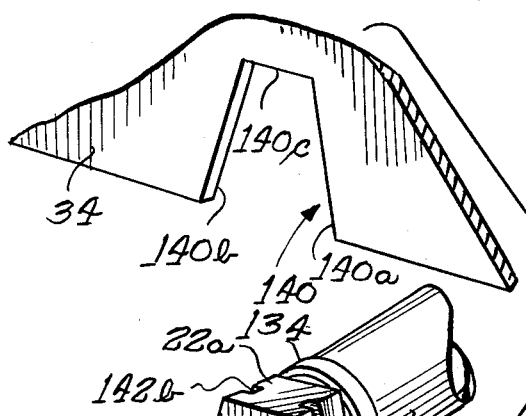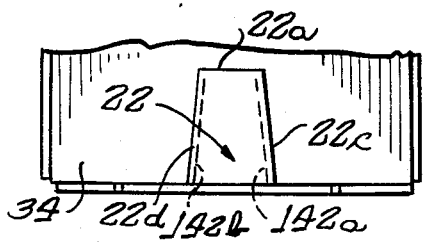

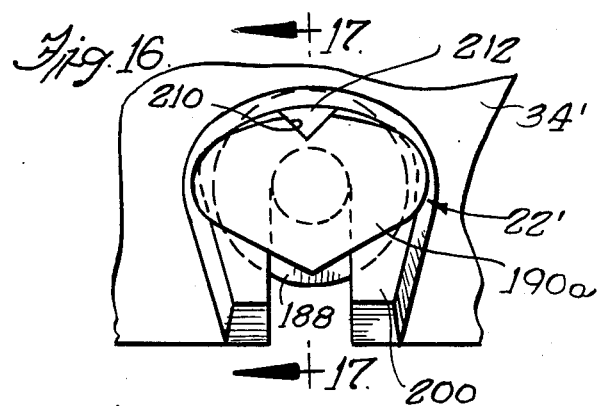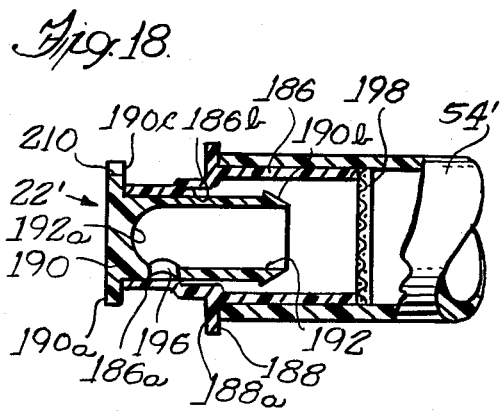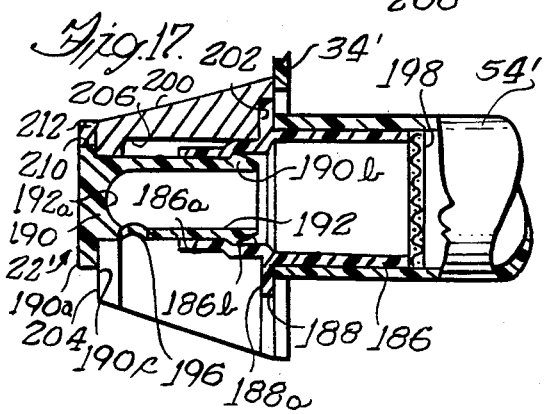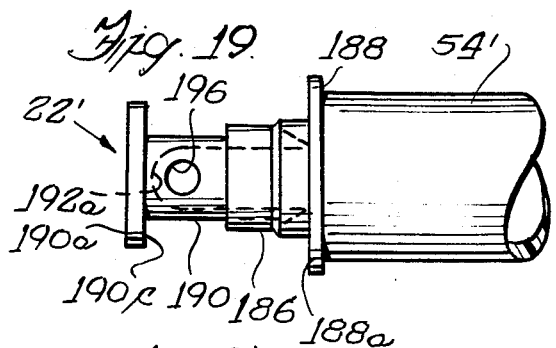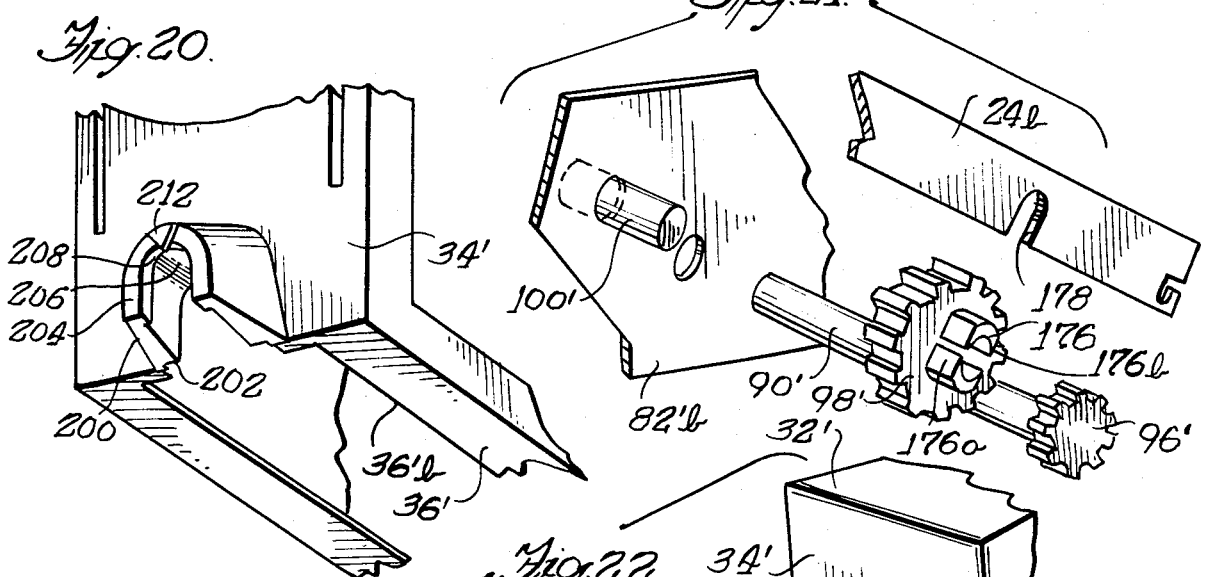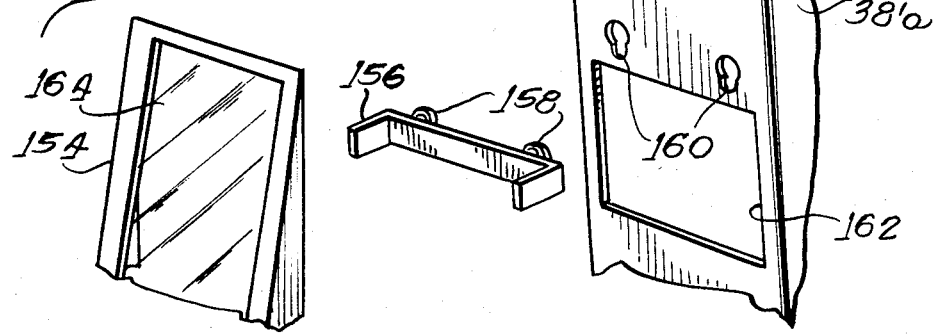

DISPENSER HAVING A FLEXIBLE FLUID CONTAINER AND A ROTOR COMPRESSIBLE FLUID DISCHARGE TUBE

This is a continuation of application Ser. No. 35,817, filed May 4, 1979 now abandoned.

The present invention relates generally to dispensing systems, and more specifically to a novel dispensing system particularly adapted for self-service dispensing of selected portions of flowable food products under highly sanitary conditions.

The advent of self-service in many types of eating establishments has created a corresponding need for self-service dispensing apparatus and systems which facilitate self-serving of flowable food products such as condiments, syrups, and toppings and the like in a relatively quick and easy manner while maintaining highly sanitized conditions so as to prevent contamination of the food products or other undesirable unsanitary conditions.

Dispensing systems of the type with which the present invention relates also find application in "fast-food" eating establishments where significant volumes of food products such as both hot and cold type sandwiches are made in an on-going manner. In such establishments, it is particularly desirable that employees be capable of dispensing condiments onto many of the food products in relatively exacting portions so as to prevent waste which can have a significant affect on operating costs. Where relatively large volumes of condiments are dispensed in a day's operation, it is particularly desirable that any dispensing system operable by employees be adapted to receive and dispense from relatively large bulk containers which enable lower cost bulk purchase. In employing bulk containers of condiments, however, it is frequently necessary that the condiment containers be removed from their associated dispensing apparatus or systems during certain periods, such as while the establishment is closed, and stored in a refrigerated area so as to prevent spoilage.

Government regulations covering food service sanitation have also been promulgated which require the maintenance of highly sanitized facilities and conditions in various aspects of food service establishments, including supplied, storage, display, serving and cleaning.

One of the primary objects of the present invention is to provide a novel dispenser system which is particularly adapted for portion dispensing of flowable food products and the like under highly efficient and sanitized conditions.

A more particular object of the present invention is to provide a novel dispensing system which is particularly adapted for dispensing flowable food products in food service establishments and which includes a support stand or frame adapted to releasably support one or more modular dispensing units each of which is individually operable to dispense a flowable food product such as condiments and the like, and wherein each dispensing module may be readily removed from the support stand for servicing or transfer to a refrigerated area during periods of nonuse so as to prevent spoilage.

Still another object of the present invention is to provide a novel dispensing module adapted to support a flexible fluid impervious container therein having a compressible flow tube affixed to the container so that a discharge fitment on the flow tube is releasably cooperative with the dispenser housing to maintain the flow tube in operative association with a rotor supported within the dispenser housing, the fitment and flow tube enabling the associated container to be readily loaded and unloaded from the dispenser module.

Yet another object of the present invention is to provide a liquid impervious flexible container having a compressible flow tube and associated novel discharge fitment which are adapted for cooperative relation with a dispenser housing to enable portion discharge through the fitment in a controlled direction without wasteful or unsanitary dripping.

A feature of the dispensing modules in accordance with the present invention lies in the manner of mounting a flexible fluid impervious food product container within each modular housing to effect a substantially continuous pressurization of product within the container so as to insure maximum discharge of product with resulting minimal waste.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a perspective view of a dispensing system constructed in accordance with the present invention embodying two modular dispensing units supported on a support stand;

FIG. 2 is a side elevational view of the dispensing system of FIG. 1, with portions broken away for clarity;

FIG. 3 is an enlarged fragmentary sectional view illustrating a portion of the product container bag and associated compressible flow tube and discharge fitment in assembled relation with a rotor to enable a peristaltic pumping action on the flow tube;

FIG. 4 is a fragmentary transverse sectional view taken substantially along line 4—4 of FIG. 3, looking in the direction of the arrows;

FIG. 5 is a fragmentary view taken substantially along line 5—5 of FIG. 4, looking in the direction of the arrows;

FIG. 6 is a fragmentary sectional view taken substantially along line 6—6 of FIG. 3, looking in the direction of the arrows;

FIG. 7 is a fragmentary bottom view taken along line 7—7 of FIG. 2, looking in the direction of the arrows;

FIG. 8 is a fragmentary sectional view illustrating the manner of releasably mounting a side plate of the dispenser housing;

FIG. 9 is an exploded fragmentary view of the upper portion of a dispenser housing of FIG. 1 and illustrating the manner of mounting the flexible product container within the housing;

FIG. 10 is an enlarged fragmentary view of the flexible product container and an associated support arm preparatory to loading in a dispenser module as shown in FIG. 1;

FIG. 11 is a fragmentary view illustrating a loaded fluid product container prior to loading in a dispenser module;

FIG. 12 is a fragmentary perspective view illustrating the manner in which the discharge fitment of one embodiment is assembled with a dispenser housing as shown in FIG. 1;

FIG. 13 is a fragmentary elevational view illustrating the discharge fitment of FIG. 12 in assembled relation with the dispenser housing;

FIG. 16 is an enlarged fragmentary front elevational view of the discharge fitment employed in the embodiment of FIG. 14 shown in assembled relation with the dispenser housing;

FIG. 17 is a fragmentary longitudinal sectional view taken substantially along line 17—17 of FIG. 16, looking in the direction of the arrows;

FIG. 18 is a fragmentary longitudinal sectional view of the discharge fitment of FIG. 17 but showing the fitment removed from the dispenser housing and in a closed condition;

FIG. 19 is a bottom view of the fitment illustrated in FIG. 18 but in an open condition;

FIG. 20 is a fragmentary perspective view illustrating the portion of the dispenser housing which receives the discharge fitment;

FIG. 21 is a fragmentary exploded perspective view illustrating the manner of mounting the operating handle and associated drive gears and drive shaft for the peristaltic pump rotor; and FIG. 22 is a fragmentary exploded perspective view illustrating the manner of mounting a closure shield window over an observation opening in the dispenser housing.

Figure 14:
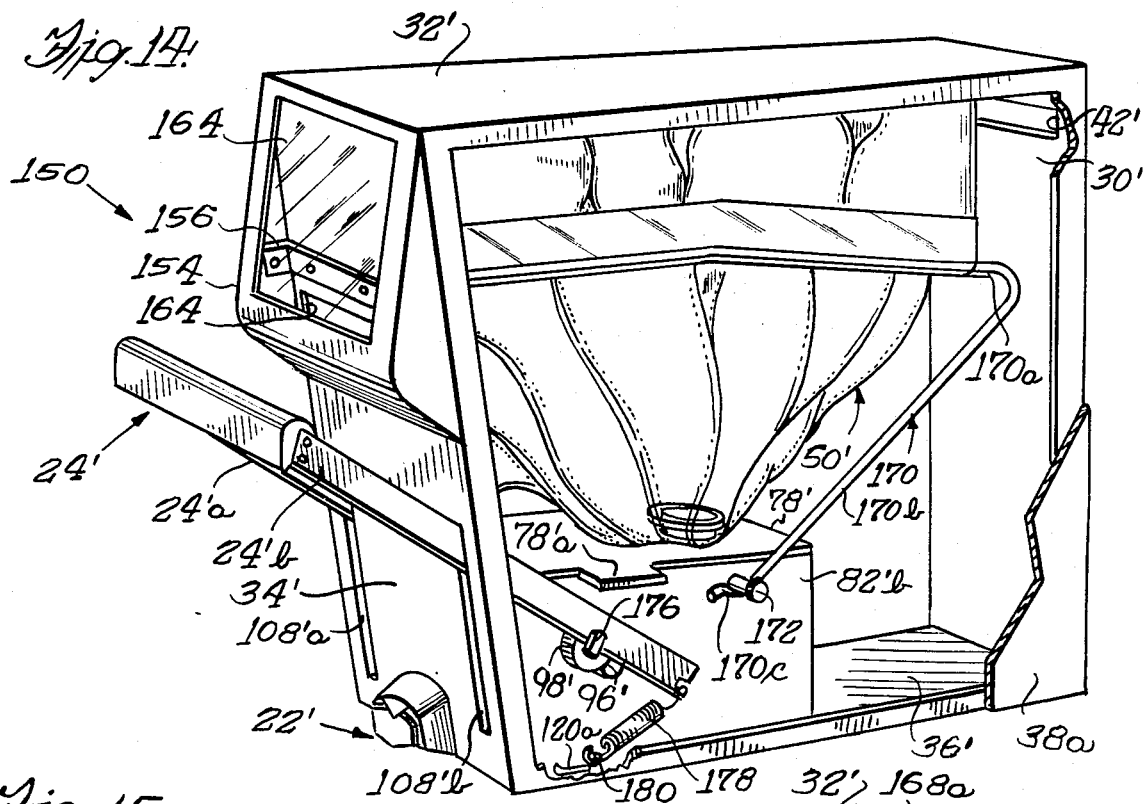
FIG. 14 is a perspective view of a dispenser module constructed in accordance with an alternative embodiment of the present invention, portions being broken away for clarity.

Referring now to the drawings, a system for dispensing fluent products constructed in accordance with one embodiment of the present invention is indicated generally at 10 in FIGS. 1 and 2. The dispenser system 10 is particularly adapted for dispensing flowable or fluent food products such as condiments, syrups, and toppings, and finds particular application in eating establishments where it is desirable that either employees or customers be able to dispense generally consistent quantity portions of condiments and the like onto sandwich-like items or onto salads or desserts without waste, and wherein the various components of the system may be serviced in a highly efficient and sanitary manner without undue downtime.

Very generally, the dispensing system 10 includes a support frame or cabinet 12 having a flat base 14 and an upstanding back wall 16 having its lateral edges formed integral with or otherwise suitably secured to laterally spaced side walls 18a and 18b. In the illustrated embodiment, the support frame 12 is adapted to support two substantially identical dispenser modules, indicated at 20a and 20b, each of which is adapted to dispense a fluent food product from a corresponding discharge fitment 22 through the manual operation of an actuating handle 24. As will become more apparent hereinbelow, each actuating handle 24 is biased toward an upper position, as shown in solid lines in FIG. 2, and is manually movable to a downward position, as shown in phantom in FIG. 2, during which a discrete portion of fluent food product may be discharged onto a food product such as a salad in a salad bowl, as indicated in phantom at 26, disposed to underlie the discharge fitment 22. In similar fashion, food product dispensed from the dispenser modules may comprise condiments for use on sandwich-like items such as hotdogs and hamburgers which may be held below the discharge fitment 22 while operating the corresponding actuating handle 24.

Describing the dispenser module 20a as being representative of the dispenser modules which may be mounted on the support frame or cabinet 12, and referring to dispenser module 20a as "20", the dispenser module includes a substantially rectangular housing which may be made of a suitable sheet metal material and includes a back or rear wall 30, a top wall 32, a front wall 34, a bottom wall 36 and opposite side walls 38a and 38b. At least one of the side walls, such as 38a, is preferably releasably mounted on the remainder of the dispenser housing to enable removal for loading and unloading of a food container within the dispenser housing and for servicing other internal components as will be described more fully below. To this end, and with particular reference to FIG. 8, the side plate 38a has upper and lower parallel channels 40a and 40b secured to its inner surface for cooperation with upwardly and downwardly directed flanges 36a and 32a formed on the bottom and top walls 36 and 32, respectively. It will be appreciated that vertical lifting of the side wall 38a serves to release the bottom bracket 40a from the upstanding flange 36a and allow removal of the side wall 38a, which may thereafter be remounted in a reverse order.

The dispenser modules 20a and 20b are adapted for releasable mounting on the support frame 12 so that the dispenser modules may be readily removed from the support frame for movement to a staging area for loading and unloading food product containers and servicing, or for movement to a refrigerated storage area during periods of nonuse. As best seen in FIGS. 2 and 8, the back wall 30 of each dispenser module has a rectangular opening 42 therethrough adapted to releasably receive an inwardly projecting and upwardly opening support bracket 44 which may be struck from the rear wall 16 of the support frame. Preferably, the support frame 12 also includes a generally horizontal platform 46 spaced above and parallel to the base 14 so that the dispenser housings rest on the platform 46 and are retained in upright position by cooperation with the corresponding support brackets 44.

In accordance with an important feature of the present invention, each dispenser module is adapted to support a flexible fluid impervious container within the dispenser housing so that each downward stroke of the corresponding operating handle 24 effects discharge of a predetermined portion of food product from the corresponding discharge fitment 22. With particular reference to FIGS. 9-11, taken in conjunction with FIGS. 2-5, a flexible container adapted to contain a flowable food product such as a flowable condiment or the like is indicated generally at 50. The container 50 may be made of a pair of indentical size sheets of flexible liquid impervious material 50a and 50b, such as a suitable polyethylene material, which are generally rectangular in plan configuration and which are secured, as by heat sealing, along their marginal edges to form a sealed fluid-tight container. Preferably, the sheets 50a, b of liquid impervious material forming the container 50 are also heat sealed along downwardly inclined and converging seal lines 52a and 52b to establish a generally conically shaped lower end of the container to which the fluent food product gravitates when the container is installed within a dispensing module 20.

A compressible tubular discharge tube 54 is connected at one end to the container 50 adjacent the center of the lower end thereof so as to communicate with the interior of the container at the intersection of the seal lines 52a, b. The discharge tube 54 may be connected in sealed relation to one of the sheets of fluid impervious material forming the container, such as 50a, through a suitable coupling or connector 56 of known design, and has a discharge fitment 22 secured to its opposite end in fluid-tight relation therewith, as will be described. The opening in the container 50 which has communication with connector 56 serves as the opening through which food product is introduced into the container.

FIG. 11 illustrates the container 50 substantially filled with a fluent food product, indicated at 58, and suspended so that the food product forms a generally oval cross-sectional shaped container. In mounting or loading a filled container 50 within a dispenser housing, the air space within the container is pressurized so as to separate the opposing film sheets 50a and 50b at their upper ends in a manner to thereafter prevent the film sheets from recontacting and effecting a wedging action which might inhibit discharge of all of the fluent food product from the container.

To accomplish such pre-pressurizing of the food container 50, a U-shaped holder member 62 having parallel closely spaced arms 62a and 62b is positioned so that one of the holder arms, such as 62a, is inserted through a passage or channel 50c formed between the container sheets 50a, b along the upper edge of the container 50. The holder member 62 is of sufficient length to extend outwardly from both ends of the channel 50c, as best seen in FIG. 10. After inserting one leg of the holder member 62 through the channel 50, the holder member is rotated about its longitudinal axis to roll the upper end of the container in the direction toward the side 50a to which the discharge tube 54 is connected. The holder member 62 is rotated a sufficient number of times to pressurize the air space within the container which causes the opposing film surfaces to be outwardly taut, as shown in FIG. 11. After so pressurizing the air chamber within the container 50, the holder member and associated container are inserted into a dispenser housing, which has previously had its side panel 38a removed, and the free ends of the holder arms 62a, b are inserted through an elongated opening 60 formed in an inverted L-shaped support bracket 68 secured to the lower surface of the upper housing wall 32 adjacent the front wall 34 of the dispenser housing. The opposite end of the container holder 62 is then inserted upwardly into a downwardly opening slot 70 formed in a support bracket 72 secured to the lower surface of the top wall 32 adjacent the rear wall 30. The support brackets 68 and 72 thus serve as support means for the container holder 62, as illustrated in FIG. 9.

As a container 50 having fluent food product therein is mounted within a dispenser housing as aforedescribed, the associated compressible discharge tube 54 and discharge fitment 22 are inserted through a suitable size opening 76 in a cover plate 78 which is mounted on upstanding transverse and longitudinal support plates 80a, 80b and 82a, 82b, respectively. The plates 80a, b and 82a, b cooperate with the cover plate 72 to define a housing internally of the dispenser in which a rotor 86 is mounted for cooperation with the discharge tube 54 so as to effect a peristaltic pumping action on the discharge tube upon rotation of the rotor 86.

The rotor 86 has four compression surfaces in the form of four rotatably mounted cylindrical rollers 88a, b, c and d supported by and between annular flanges 86a and 86b in circumferentially equidistantly spaced relation about the axis of the rotor. The rotor is mounted on a transverse drive shaft 90 rotatable within suitable bores in the support plates 82a, b, and is adapted for driving rotation with the drive shaft through unidirectional clutch means which may take the form of a Sprague-clutch 92 interdisposed between the drive shaft and rotor. The drive shaft 90 extends outwardly from the support plate 82a and has a spur gear 96 fixed thereon which meshes with a drive gear 98 rotatably mounted on a stub shaft 100 fixed on the support plate 82a in overlying spaced relation from the axis of shaft 90, as illustrated in FIGS. 4 and 5. The drive shaft 90 is releasably retained in mounted relation on the support plates 82a, b by a releasable retaining ring 101 (FIG. 4) which, when removed, allows removal of the drive shaft 90 from the rotor 86 to release the rotor for cleaning or servicing. The drive gear 98 has a boss 98a formed thereon on which is mounted an arm 24a of the U-shaped operating handle 24 so that movement of the operating handle effects a corresponding rotation of the drive gear 98. The U-shaped operating handle 24 has its opposite arm 24b mounted on a collar or stepped sleeve bearing 102 which is rotatably supported on a stub shaft 104 fixed to the support plate 82b in axial alignment with the stub shaft 100. The arms 24a and 24b extend forwardly from their pivot axis 100–104 through vertically disposed slots 108a and 108b, respectively, formed in the front wall 34 of the dispenser housing.

The operating handle 24 is biased to an upper position wherein the arms 24a and 24b engage the upper ends of their respective slots 108a, b by a coil tension spring 110 having one end connected to one of the arms of the operating handle, such as 24a, and having its opposite end secured to a bracket 112 fixed to the dispenser housing interiorly thereof. Downward movement of the operating handle 24 is limited by engagement of the arms 24a, b with the lower ends of the slots 108a, b. The lengths of the slots 108a, b and the gear ratio between the spur gears 96 and 98 are selected so that a full downward stroke of the operating handle effects predetermined rotation of the rotor 86 in a clockwise direction, as considered in FIG. 3. In the illustrated embodiment, each downward stroke of the operating handle 24 through an arcuate movement of 45° is operative to effect a quarter revolution of the rotor 86 so that each of the compression rollers 88a, b moves through an arc of 90° about the axis of the drive shaft 90.

To enable positioning of the discharge tube 54 in proper cooperation with the rotor 86 during loading of the food container 50 and discharge tube within a dispenser housing, the dispenser housing has a rectangular opening 36b formed in its bottom wall 36 to intersect the forward edge of the bottom wall, as best seen in FIGS. 3 and 7. A cam plate 116 of generally rectangularly plan configuration is pivotally mounted on a transverse pivot pin 118 fixed to and between the support plates 82a and 82b. The cam plate 116 is approximately equal in plan size to the opening 36b and is movable between a lowered position, as shown in phantom in FIG. 3, which allows downward insertion of the discharge tube 54 and associated fitment 22 between the cam plate and the rotor 86, and a closed position wherein an arcuate cam surface 116a engages the discharge tube and maintains it in predetermined operating relation with the compression rollers 88a–d of the rotor 86, as shown in solid lines in FIG. 3.

The cam plate 116 is releasably maintained in its upper closed position by an L-shaped locking pin 120 which is adapted to be inserted through axially aligned bores 122a and 122b in the support plates 82a, b, respectively, and through a transverse bore 124 in the cam plate, as best seen in FIG. 4. To facilitate insertion and removal of the locking end 120, the upwardly turned flange 36a on the bottom wall 36 of the dispenser housing is relieved or slotted at 36c so that with the side wall 38a removed, the locking pin may be inserted into the aligned bores 122a, b and 124 and an outer end 120a of the locking pin moved to a generally horizontal position so as to lie inwardly of the flange 36a and prevent unintentional withdrawal.

With the cam plate 116 in its lowered position, and with the flow tube 54 inserted between the cam plate and rotor 86 as during loading of the food container 50 into the dispenser, the fitment 22 is connected to the front wall 34 of the dispenser housing in a predetermined discharge position. With particular reference to FIGS. 3, 12 and 13, the fitment 22 preferably includes a fitment body made from an injection moldable plastic material compatible with fluent food products and which facilitates low cost manufacturing so that the fitments may be discarded after single use with an associated food product container 50. The body of fitment 22 has a generally trapezoidal front elevational configuration defined by upper and lower parallel planar surfaces 22a and 22b, respectively, and downwardly diverging planar side surfaces 22c and 22d. The body of the discharge fitment 22 is formed with a cylindrically shaped boss portion 130 which has an annular recess 132 formed circumferentially thereof. The boss 130 is adapted to be inserted within the outer free end of a flow tube 54 whereafter a suitable retaining ring 134 is secured about the flow tube in overlying relation to recess 132 so as to retain the fitment on the flow tube. A discharge passage 136 is formed in the fitment, as best seen in FIG. 3, so as to extend axially of the boss 130 and also intersect the bottom surface 22b in substantially normal relation thereto. A tab or tape 138 is secured on the lower surface 22b of the fitment by a suitable adhesive so as to prevent leakage from the fitment during storage and loading of a food container 50 into a dispenser housing, the tape 138 being readily removable from the fitment to enable discharge from the discharge passage 136.

The front wall 34 of the dispenser housing is formed with a recess 140 which intersects opening 36b and is defined by downwardly diverging laterally spaced retaining edge surfaces 140a and 140b and an upper edge surface 140c parallel to the lower edge of the front wall 34. The diverging side surfaces 22c and 22d of the fitment 22 have open rectangular channels or locating grooves 142a and 142b formed therein which extend the full lengths of the side surfaces and have lateral widths only slightly greater than the thickness of the front wall 34 of the dispenser housing. The channels 142a, b are sized to receive and frictionally retain the retaining edges 140a and 140b of housing recess 140 when the fitment is inserted upwardly into the recess so that the upper fitment surface 22a abuts the top edge surface 140c of the recess. The open channels or recesses 142a, b are inclined relative to the axis of the discharge end of passage 136 at an angle substantially equal to the angle of rearward incline of the front dispenser wall 34 relative to a plane normal to the bottom wall 36 so that when the fitment is positioned in recess 140, the discharge end of discharge passage 136 is substantially vertical. The fitment 22 and housing recess 140 are configured so that the cam plate 116 cannot be fully closed unless the fitment is correctly installed within the recess 140.

The discharge fitment 22 associated with each food container 50 may be color coded to identify the particular food product in the associated container so as to enable an operator to more readily identify the food product being loaded into the dispenser and thereby prevent errors in loading.

After attaching the fitment 22 of a food product container 50 to the front wall of a dispenser housing, the cam plate 116 is pivoted upwardly and secured in position through a locking pin 120. The operator may then mount the dispenser module on a support frame 12, remove the tab 138 and stroke the operating handle 2-3 times to bleed any air from the discharge tube 54 and draw food product downwardly from the flexible container 50 into the discharge tube 54. Thereafter, each subsequent full downward stroke of the operating handle effects substantially 90° rotation of the rotor 86 and causes a predetermined portion discharge of food product from the discharge fitment 22. During a period of nonuse, the operator may re-affix the tab or tape 138 over the fitment discharge passage and remove the associated dispenser module from the support frame 12 for movement to a storage area, such as a refrigerated area, or to a product staging area for replacement of the food container 50 after it has been emptied.

If desired, a suitable indicator (not shown) could be provided on each dispenser module to indicate the extent of discharge of food product from the associated food product container 50. Such an indicator could be of conventional design and responsive to the weight of the food product container so as to indicate the extent of emptiness of the container based upon its weight. For example, a spring loaded bar could be attached interiorly of the dispenser housing and biased upwardly against the weight of a food container 50 so that an associated indicator could be observed from externally of the dispenser housing to indicate the state of fullness or emptiness of the food container.

FIGS. 14–22 illustrate an alternative embodiment of a dispenser module, indicated generally at 150, constructed in accordance with the present invention. The dispenser module 150 is generally similar to the aforedescribed dispenser modules 20a, b and is adapted to be mounted with a plurality of other similar dispenser modules on a common support frame such as the aforedescribed support frame or cabinet 12. For purposes of comparing the dispenser module 150 to the aforedescribed dispenser modules 20a and 20b, elements of the dispenser module 150 which are generally similar to corresponding elements in the aforedescribed dispenser module 20a will be identified with similar but primed reference numerals.

Very generally, the dispenser module 150 includes a rectangularly shaped dispenser housing having a back wall 30', a top wall 32', a front wall 34', a bottom wall 36' and planar side walls 38'a and 38'b at least one of which, such as 38'a, is releasably mounted to facilitate removal for loading and unloading a fluid impervious flexible food container 50' and servicing and cleaning of the various elements, including a rotor 86' supported within the dispenser housing for operative association with a compressible discharge tube 54' on the food container so as to effect a peristaltic pumping action on securing it in discharge position on the dispenser housing. Referring to FIGS. 16–20, taken in conjunction with FIGS. 14 and 15, the fitment 22' includes an outer tubular member 186 which is adapted to be inserted within the outer end of the compressible discharge tube 54' so as to be frictionally retained therein. An annular radial flange 188 is formed integral on the tubular member 186 and serves as a shoulder stop to abut against the outer end of the discharge tube. A reduced diameter tubular sleeve 186a is formed integral with the flange 188 in axial alignment with the tubular member 186 and has an inner cylindrical surface which slidably receives the outer surface of a cylindrical slide valve member 190. The slide valve 190 is axially slidable within the tubular member 186 in telescoping relation therewith and has a generally heart-shaped radial end flange 190a which provides a stop to limit the extent of axial movement of the slide valve 190 into the tubular sleeve 186a.

The slide valve 190 has an axial discharge passage 192 formed therein which has communication with the discharge tube 54' and terminates at its forward end in a generally semi-spherical surface 192a the center of curvature of which preferably lies in a vertical plane containing the axis of discharge passage 192 and is disposed slightly below the axis of discharge passage 192. The slide valve 190 has a transverse discharge orifice 196 adapted to be closed by the tubular sleeve 186a when the slide valve is in a first or inward closed position within sleeve 186a, as shown in FIG. 17. In this position, the contents in the associated container 50' are sealed within the container and associated discharge tube 54'. The slide valve 190 is axially slidable to a second or outward discharge position in which an annular rib 190b formed on the inner end of the slide valve limits such outward movement and is frictionally received within an annular recess 186b formed internally of the tubular sleeve 186a so as to releasably maintain the slide valve in its outward discharge position, as shown in FIG. 18. Preferably, the annular recess 186b is tapered outwardly from its entrance so as to provide a detent-like retention with the annular rib 190b on the slide valve 190. With the slide valve 190 in its outer discharge position, the orifice 196 is free of the tubular sleeve 186a for discharge of fluent food product from the associated container 50'. The curvature of the end surface 192a of the discharge passage 192 acts on the fluent product being discharged to effect a slight reverse flow component which prevents discharge of product in a forward direction from the dispenser. This feature is particularly important to prevent discharge of product onto a user standing before the dispenser during operation thereof.

The fitment 22' may also be formed of a suitable plastic material which lends itself to injection molding and which may be color coded to designate a particular fluent food product in the corresponding food container 50'. If desired, a suitable filter disc 198 may be mounted within the discharge tube 154' to abut the inner end of the tubular member 186.

To facilitate positioning of the fitment 22' in predetermined relation on the dispenser module 150, a fitment housing 200 is secured to the front wall 34' of the dispenser housing adjacent the lower edge thereof. The fitment retaining housing 200 has a recessed reference surface 202 having predetermined dimensional spacing from and parallel to a front planar surface 204 on the fitment retaining housing. The distance between the parallel surfaces 202 and 204 on the fitment retaining housing is substantially the same as the distance between parallel reference surfaces on the discharge fitment defined by an outer planar reference surface 188a on flange 188 and an inner planar reference surface 190c on flange 190a of slide valve 190 when the slide valve is in its outer discharge position relative to the tubular member 186. The fitment retaining housing 200 has internal radial surfaces 206 and 208 which define the upper wall surfaces of an internal chamber in the fitment housing which opens downwardly as to receive a fitment 22' upwardly within the fitment housing.

After positioning a discharge tube 54' and associated discharge fitment 22' about the rotor 86' preparatory to closing the cam plate 116', the slide valve 190 is moved axially outwardly from the tubular sleeve 186a and the fitment is inserted upwardly into the fitment housing 200 so that the internal surfaces 206 and 208 in the fitment housing are engaged by outer peripheral surfaces of the tubular sleeve 186a and slide valve 190, respectively. In this position, the surfaces 188a and 190c on the discharge fitment 22' engage the fitment housing surfaces 202 and 204 so as to retain the fitment in relatively fixed and predetermined discharge position relative to the dispenser housing. The cam plate 116' is then closed and locked to retain the discharge tube 54' and fitment 22' in operative position.

To assure that the discharge orifice 196 is in a downwardly directed position when the fitment 22' is inserted within the fitment retaining housing 200, the flange 190a on the slide valve 190 is formed with a V-shaped recess 210 which is adapted for cooperating relation with a complementary shaped detent 212 formed on the fitment retaining housing when the discharge fitment is properly and fully inserted into the fitment retaining housing. Because the slide valve 190 is rotatable within the tubular sleeve 186a, the detent 212 will cam the flange 190a and slide valve to a proper discharge position if the slide valve is not inserted so that the recess 210 directly receives the detent 212 therein. The peripheral flange 190a on the slide valve 190 is preferably formed so as to define a generally pointed lower edge opposite the V-shaped recess 210, as best seen in FIG. 17, so as to provide a visual indication of the direction of discharge during operation of the associated dispenser module.

The operation of the dispenser module 150 is generally similar to the operation of the aforedescribed dispenser module 20a except for the manner of mounting the food container 50' and preparing the fitment 22' and assembling it within the fitment retaining housing 200 on the dispenser housing.

With the dispenser modules 20a, 20b and 150 as thus described, it will be appreciated that the dispenser modules may be readily removed from associated support frames or cabinets and moved to a service or staging area for cleaning, loading or other servicing or, alternatively, to a refrigerated storage area during non-use. The dispenser modules have the particular advantage that a flexible food container can be readily and quickly loaded into and unloaded from the associated dispenser housing in a manner to effect uniform preloading or pressurizing of the fluent food product containers so as to insure substantially full discharge thereof. As aforedescribed, the manner of mounting the rotors 86, 86' and associated rotor drive shafts 96 and 96' enables the rotors 86 and 86' to be readily removed from the dispenser housings for cleaning and servicing.

While preferred embodiments of the present invention have been illustrated and described, it will be unthe tube for discharge of fluid product from an associated discharge fitment 22' upon downward movement of an externally projecting operating handle 24'. The rear wall 30' of the dispenser housing has a rectangular opening 42' therein adjacent the upper end thereof to facilitate mounting of the dispenser module 150 on the aforedescribed support frame 12.

The dispenser module 150 has a removable display cover 154 which has a U-shaped bracket 156 secured thereon to facilitate releasable mounting of the display cover on the front housing wall 34' through a pair of headed retainer pins 158 fixed on bracket 156 and adapted for insertion and retention within laterally spaced key-hole shaped slots 160 in the front wall 34'. In its mounted position, the cover 154 overlies a rectangular opening 162 in the front wall of the dispenser housing. The displayer cover 154 is preferably provided with a see-through plastic window 164 on which printed graphics might be displayed for indicating the contents of the dispenser module and through which an operator may visually observe the condition of the food container 50' so as to establish its relative fullness. It will be appreciated that a plurality of display covers might be provided, each of which has different printed graphics thereon to enable interchanging of cover plates with different food product to be dispensed.

Figure 15:
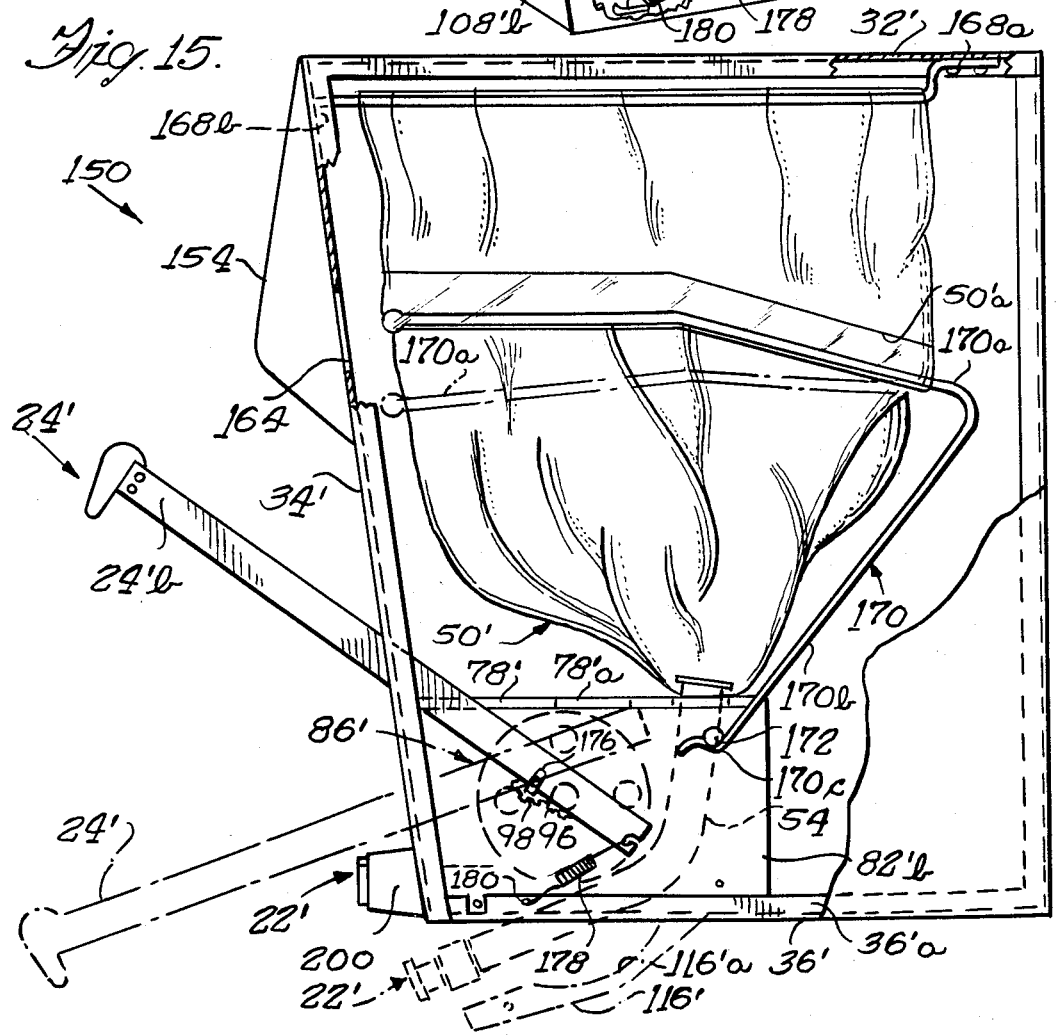
FIG. 15 is a side elevational view of the dispenser module of FIG. 14 but with additional portions broken away for illustration.

A difference between the dispenser module 150 and the aforedescribed dispenser module 20a lies in the manner of mounting a flexible food container 50' within the dispenser housing so as to continually maintain the air spaced or head within the container slightly pressurized and thus insure substantially complete discharge of fluent food product from the container. Referring particularly to FIGS. 14 and 15, when mounting a filled food container 50' into the dispenser housing, the upper end of the flexible container is passed over a horizontally disposed hanger bar 168 having one end 168a secured to the upper wall 32' adjacent its rearward edge and having a forward downwardly turned end 168b suitably secured to the forward wall 34' so that the hanger bar 168 is spaced downwardly from the upper wall 132' to enable threading of the flexible container over the hanger bar. After passing the upper end of the container 50' over the hanger bar 168, an arm portion 170a of a spring arm 170 is inserted through the transverse channel 50'a formed at the free upper end of the container 50'. A downwardly inclined arm portion 170b of the spring arm is formed with a lower hook end 170c which is pulled downwardly and hooked about a retaining pin 172 fixed on the upstanding support wall 82'b. The spring arm 170 is made of a suitable metallic spring rod material and has a configuration such that when the upper end of a loaded container 50' is passed over the hanger bar 168 and the arm portion 170a of the spring arm is inserted through the passage 50'a, a slight bending or distortion of the arm portion 170b relative to arm portion 170a is required in order to hook the end 170c about the retaining pin 172. This action serves to bias the container bag about the hanger bar 168 so as to pressurize the air head or space within the container. During emptying or discharge of food product from the container 50, the spring arm 170 continues to progressively draw the upper end of the container over the hanger bar 168 so as to maintain a substantially constant pressure head within the container. The spring arm 170 provides a preloading or pressurization of the product containers which is substantially uniform between different containers and which is independent of the particular operator.

Another feature of the dispenser module 150 which differs from the aforedescribed dispenser module 20a is the manner of mounting the operating handle 24' in interconnecting relation with the rotor 86'. Noting particularly FIG. 21, the rotor 86', which is identical to the aforedescribed rotor 86, is mounted on a drive shaft 90' which is removably mounted in suitable axially aligned bores in the support plates 82'a, b. A spur gear 96' is fixed on an outer end of the shaft 90' outwardly of support plate 82'b and is cooperable with and rotated by a drive spur gear 98' rotatable on a stub shaft 100' fixed to the support plate 82'b so that a plane containing the axes of the drive shaft 90' and stub shaft 100 subtends an angle of approximately 45° with the plane of the bottom wall 36'.

The drive gear 98' has an axially extending mounting boss 176 integral therewith which has diametrically opposite flat surface areas 176a and 176b formed thereon. An open ended transverse slot 178 is formed in the arm 24'b of operating handle 24 and is sized to snugly but releasably receive the mounting boss 176 therein so that the operating handle may be readily releasably mounted on the drive gear 98' and is operative to rotate the drive gear. The support plate 82'a has a suitable cylindrical stub shaft (not shown) mounted thereon in axial alignment with the stub shaft 100' so as to be received within a slot (not shown) in the operating handle arm 24'a corresponding in position to slot 178 when the operating handle is in operatively mounted position.

As best seen in FIGS. 14 and 15, the operating handle 24' is U-shaped and, in operative position, has its arm portions 24'a and 24'b extending inwardly through elongated slots 108'a and 108'b formed in the front wall 34'. With the arm portions 24'a, b of handle 24' mounted on boss 176 and the opposite stub shaft aligned with shaft 100, a coil tension spring 178 is connected at one of its hooked ends to the innermost end of the arm portion 24'b and has its opposite end connected to a retaining pin 180 fixed on the mounting plate 82'b so as to bias the operating handle toward its upward position wherein the arm portions engage the upper ends of the slots 108'a, b in front wall 34'. When the operating handle 24' is moved to its downward position, the innermost end of at least one of the arms, such as 24'b, engages a laterally outwardly extending projection 78'a formed on the cover plate 78' to provide a positive stop for the operating handle 78' and prevent possible release of the operating handle from the mounting boss 176 as could happen if the operating handle were to fulcrum about the lower ends of the slots 108'a, b without limiting the extent of upward movement of the inner ends of the handle arm portions. The spur gears 98' and 96' are adapted to effect approximately 90° rotation of the rotor 86' for each approximately 45° downward arcuate stroke of the operating handle 24' in similar fashion to the aforedescribed dispenser module 20a. It will be appreciated that with the operating handle 24' thus mounted on the drive gear 98' and an opposite axially aligned stub shaft (not shown), releasing the spring 178 allows removal of the operating handle and drive shaft 90' to release the rotor 86' which may then be removed for easy cleaning or servicing.

Still another feature of the dispenser module 150 which differs from the aforedescribed dispenser module 20a lies in the discharge fitment 22' and the manner of derstood that changes and modifications may be made therein without departing from the invention in its broader aspects. Various features of the invention are defined in the following claims.

What is claimed is:

1. A dispenser comprising, in combination,
    a dispenser housing defining an interior chamber and including side walls and a bottom wall having an opening therein, and a front, general vertical wall,
    a disposable flexible fluid impervious container adapted to contain flowable product in substantially sealed relation therein, said container having an outlet opening through which said product may be removed from said container,
    means cooperable with said container and said housing to releasibly support said container within said chamber so that said product is urged toward said outlet opening under the influence of gravity,
    means defining an additional opening in said housing to admit said disposable container for attachment to said means for releasably supporting said container,
    a disposable compressible discharge tube affixed to said container adjacent said outlet opening and having flow communication with product within said container,
    a disposable discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing,
    a rotor rotatably supported within said housing for cooperation with said discharge tube so as to effect flow of product through said discharge tube from said container upon selective rotation of said rotor,
    an actuating handle located at said front wall above said discharge fitment and cooperable with said rotor and operable to rotate said rotor with a downward pull on said handle through a predetermined stroke so as to effect a substantially predetermined quantity discharge from said container upon each actuating stroke of said handle, said discharge fitment being located beneath said handle,
    a cam plate pivotally mounted on said housing adjacent said opening in the bottom wall and having an arcuate cam surface thereon, said cam plate being pivotally movable independently of said housing between a first position enabling loading of a flexible container and associated discharge tube within said chamber and a second position wherein said cam surface is positioned for cooperation with said discharge tube so as to effect occlusion of said discharge tube during rotation of said motor,
    and means selectively cooperable with said housing and said cam plate for releasably retaining said cam plate in its said second position.

2. A dispenser as defined in claim 1 including means releasably mounting said rotor within said dispenser housing in a manner to enable removal of said rotor through said opening for servicing.

3. A dispenser system as defined in claim 2 wherein said rotor mounting means includes a rotor mounting shaft and means releasably supporting said mounting shaft in predetermined relation to said opening in said bottom wall, said rotor receiving said mounting shaft therethrough in releasable supporting relation therewith so as to define the axis of rotation of said rotor, said actuating handle being cooperable with said mounting shaft so that predetermined movement of said actuating handle effects predetermined rotation of said rotor, said actuating handle enabling removal of said mounting shaft from said rotor to release said rotor for removal from said housing.

4. A dispenser comprising, in combination, a housing having a substantially vertical front wall and a bottom and defining an interior chamber,
    a support frame for detachably supporting said housing, including a horizontal base spaced from said bottom wall of said housing,
    a disposable flexible fluid impervious container adapted to contain flowable product in substantially sealed relation therein, said container having an outlet opening through which said product may be removed from said container,
    means cooperable with said container and said housing to releasably support said container within said chamber so that said product is urged toward said outlet opening under the influence of gravity,
    a compressible discharge disposable tube affixed to said container adjacent said outlet opening and having flow communication with product within said container,
    a disposable discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing to discharge to a receptable located between said botton wall and said base of said frame,
    a rotor rotatably supported within said housing on a rotor mounting shaft for cooperation with said discharge tube so as to effect flow of product through said discharge tube from said container upon selective rotation of said rotor,
    an actuating handle mounted on said housing on pivot shaft means for pivotal movement about a pivot axis parallel to and spaced from said rotor mounting shaft, said actuating handle located at the front wall and movable downwardly and extending internally of said housing and cooperable with said rotor, said housing having means cooperative with said handle to limit movement thereof through a predetermined maximum arcuate downward stroke relative to said housing,
    and means interconnecting said actuating handle to said rotor so that downward movement of said actuating handle through said predetermined stroke effects rotation of said rotor through a greater angular rotation than the actuating handle for each downward stroke of said handle to effect substantially predetermined quantity discharge from said container, while reverse movement of said actuating handle is inoperative to rotate said rotor,
    said disposable container being carried in said housing for detachment therewith from said support frame,
    said rotor and said actuating handle also being mounted in the housing and carried therewith from said support frame, and
    means defining an open, front to rear extending side in said housing when detached from said support frame to allow replacement of the disposable container, and means detachably connecting said housing to said support frame to position said handle and said rotor relative to said horizontal base for dispensing from the fitment with operation of the handle.

5. A dispenser as defined in claim 4 wherein said actuating handle is releasably supported on a pivot axis internally of said housing.

6. A dispenser comprising, in combination, a housing defining an interior chamber, a flexible fluid impervious container adapted to contain flowable product in substantially sealed relation therein, said container having an outlet opening through which said product may be removed from said container, support means cooperable with said container and said housing to releasably support said container within said chamber so that said product is urged toward said outlet opening under the influence of gravity, said container having a channel formed therethrough and said support means including means adapted to be inserted through said channel and cooperative with said housing in a manner enabling pre-pressurizing of said flexible container as it is loaded into said chamber, a compressible discharge tube affixed to said container adjacent said outlet opening and having flow communication with product within said container, a discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing, a rotor rotatably supported within said housing for cooperation with said discharge tube so as to effect flow of product through said discharge tube from said container upon selective rotation of said rotor, and an actuating handle cooperable with said rotor and operable to rotate said rotor so as to effect substantially predetermined quantity discharge from said container upon each actuating stroke of said handle.

7. A dispenser comprising, in combination, a housing defining an interior chamber, a flexible fluid impervious container adapted to contain flowable product in substantially sealed relation therein, said container having an outlet opening through which said product may be removed from said container, support means cooperable with said container and said housing to releasably support said container within said said chamber so that said product is urged toward said outlet opening under the influence of gravity, said support means including means enabling pre-pressurizing of said flexible container as it is loaded into said chamber, a compressible discharge tube affixed to said container adjacent said outlet opening and having flow communication with product within said container, a discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing, a rotor rotatably supported within said housing for cooperation with said discharge tube so as to effect flow of product through said discharge tube from said container upon selective rotation of said rotor, and an actuating handle cooperable with said rotor and operable to rotate said rotor so as to effect substantially predetermined quantity discharge from said container upon each actuating stroke of said handle, said fluid impervious container having a channel formed therethrough, and said means enabling prepressurizing of said container including a holder member adapted to be inserted through said channel and rotated about its axis so as to pressurize said container, said housing having support bracket means adapted to releasably support said holder member within said chamber so that said container hangs downwardly from said holder member.

8. A dispenser comprising, in combination, a housing defining an interior chamber, a flexible fluid impervious container adapted to contain flowable product in substantially sealed relation therein, said container having an outlet opening through which said product may be removed from said container, support means cooperable with said container and said chamber so that said product is urged toward said outlet opening under the influence of gravity, said support means including means enabling pre-pressurizing of said flexible container as it is loaded into said chamber, a compressible discharge tube affixed to said container adjacent said outlet opening and having flow communication with product within said container, a discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing, a rotor rotatably supported within said housing for cooperation with said discharge tube so as to effect flow of product through said discharge tube from said container upon selective rotation of said rotor, and an actuating handle cooperable with said rotor and operable to rotate said rotor so as to effect substantially predetermined quantity discharge from said container upon each actuating stroke of said handle, said fluid impervious container having a channel formed therethrough, said means to releasably support said container including a hanger bar supported by said housing within said chamber and adapted to have said container passed thereover so that said channel is substantially parallel to said hanger bar, and said means enabling pre-presurrizing of said container including a spring arm having a first arm portion adapted to be inserted through said channel and a second arm portion adapted for releasable connection to said housing so as to bias said container about said hanger bar in a manner to pressurize the contents within said container.

9. A dispenser comprising, in combination, a dispenser housing defining an interior chamber, a flexible fluid impervious container adapted to contain flowable product in substantially sealed relation therein, said container having an outlet opening through which said product may be removed from said container, means cooperable with said container and said housing to releasably support said container within said chamber so that said product is urged toward said outlet opening under the influence of gravity, a compressible discharge tube affixed to said container adjacent said outlet opening and having flow communication with product within said container, a discharge fitment including a tubular member connected to said discharge tube in flow communication therewith, and a slide valve mounted on said tubular member for axial telescoping relation therewith between open and closed positions, said slide valve having a discharge orifice formed therein through which product from said container may be dicharged, said discharge orifice being closed by said tubular member when said slide valve is in its said closed position and being open when said slide valve is in its said open position, a rotor rotatably supported within said housing for cooperation with said discharge tube so as to effect flow of product through said discharge tube from said container upon selective rotation of said rotor, actuating means cooperable with said rotor and operable to rotate said rotor so as to effect substantially predetermined quantity discharge from said container, and a fitment retaining housing mounted on said dispenser housing, said fitment retaining housing and said discharge fitment being adapted for supporting cooperating relation so that said fitment may be supported by said retaining housing only when said slide valve is in its said open position.

10. A dispenser as defined in claim 9 wherein said slide valve and said fitment retaining housing define mutually cooperable registration means thereon cooperable to effect predetermined orientation of said discharge orifice relative to said dispenser housing when said discharge fitment is supported by said fitment retaining housing.

11. A dispensing system comprising, in combination, a support frame having an upstanding back wall and a lower horizontal base, at least one dispenser module having a housing having a front wall and having an interior chamber, said module and support frame having mutually cooperable means adapted to enable releasable supporting connection of said module to said support frame, a disposable flexible fluid impervious container adapted to contain flowable product in substantially sealed relation therein, said container having an outlet opening through which said product may be removed from said container, means cooperable with said container and said housing to releasably support said container within said chamber so that said product is urged toward said outlet opening under the influence of gravity, means defining an additional opening in said housing to admit said disposable container for attachment to said means for releasably supporting said container, a disposable compressible discharge tube affixed to said container adjacent said outlet opening and having flow communication with product within said container, a discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing, a rotor rotatably supported within said housing for cooperation with said discharge tube so as to effect flow of product through said discharge tube from said container upon selective rotaton of said rotor, an actuating handle located on said front wall above said discharge fitment to be pulled downwardly through an actuating stroke and cooperable with said rotor and operable to rotate said rotor so as to effect substantially predetermined quantity discharge from said container upon each actuating stroke of said handle, said dispenser housing including a bottom wall having an opening therein said bottom wall being spaced substantially above said horizontal base of said frame to allow insertion of receptacles into a space between said bottom wall and said horizontal base, a cam plate pivotally mounted on said housing within said opening and having an arcuate cam surface thereon, said cam plate being pivotally movable independently of said housing between a first position in said space enabling loading of a flexible container and associated discharge tube within said chamber and a second position wherein said cam surface is positioned for cooperation with said discharge tube so as to effect occlusion of said discharge tube during rotation of said rotor, and means selectively cooperable with said housing and said cam plate for releasably retaining said cam plate in its said second position.

12. A dispensing system as defined in claim 11 including means releasably mounting said rotor within said dispenser housing in a manner to enable removal of said rotor through said opening for servicing.

13. A dispenser system as defined in claim 12 wherein said rotor mounting means includes a rotor mounting shaft and means releasably supporting said mounting shaft in predetermined relation to said opening in said bottom wall, said rotor receiving said mounting shaft therethrough in supporting relation therewith so as to define the axis of rotation of said rotor, said actuating handle being cooperable with said mounting shaft so that predetermined movement of said actuating handle effects predetermined rotation of said rotor, said actuating handle enabling removal of said mounting shaft from said rotor to release said rotor for removal from said housing.

14. A dispensing system as defined in claim 11 wherein said actuating handle is movable through a predetermined stroke relative to said housing, and including means interconnecting said actuating handle to said rotor so that movement of said actuating handle through said predetermined stroke effects predetermined rotation of said rotor, while reverse movement of said actuating handle is inoperative to rotate said rotor.

15. A dispensing system as defined in claim 14 wherein said actuating handle is pivotal about a pivot axis through a predetermined maximum arcuate stroke, said means interconnecting said actuating handle to said rotor being operative to effect rotation of said rotor through a greater angular rotation than the actuating handle for each stroke of said handle.

16. A dispensing system as defined in claim 15 wherein said actuating handle is releasably supported on a pivot axis internally of said dispenser module housing, and means limiting the extent of movement of said handle during each said predetermined stroke thereof.

17. A dispensing device as defined in claim 11 wherein said support frame includes a base having a planar support surface enabling independent self-support on a horizontal support surface, said support frame further having an upstanding back plate fixed to said base and having a support bracket thereon, said dispensing module having a rear wall defining an opening therein adapted to receive said support bracket in releasable supporting relation with said module.

18. A dispensing system comprising, in combination,
a support frame,
at least one dispenser module having a housing defining an interior chamber, said module and support frame having mutually cooperable means adapted to enable releasable supporting connection of said module to said support frame,
a flexible fluid impervious container adapted to contain flowable product in substantially sealed relation therein,
said container having an outlet opening through which said product may be removed from said container,
support means cooperable with said container and said housing to releasably support said container within said chamber so that said product is urged toward said outlet opening under the influence of gravity, said container having a channel formed therethrough and said support means including means adapted to be inserted through said channel and cooperative with said housing in a manner enabling pre-pressurizing of said flexible container as it is loaded into said container,
a compressible discharge tube affixed to said container adjacent said outlet opening and having flow communication with product within said container,
a discharge fitment mounted on an end of said discharge tube opposite said container and having a discharge orifice in flow communication with said discharge tube, said fitment being adapted for releasable cooperation with said housing so as to maintain said discharge fitment in predetermined relation to said housing,
a rotor rotatably supported within said housing for cooperation with said discharge tube so as to effect flow of product through said discharge tube from said container upon selective rotation of said rotor,
and an acutating handle cooperable with said rotor and operable to rotate said rotor so as to effect substantially predetermined quantity discharge from said container upon each actuating stroke of said handle.

19. A dispensing system as defined in claim 18 wherein said means enabling pre-pressurizing of said container includes a holder member adapted to be inserted through said channel and rotated about its axis so as to pressurize said container, said housing having support bracket means adapted to releasably support said holder member within said chamber so that said container hangs downwardly from said holder member.

20. A dispensing system as defined in claim 18 wherein said means to releasably support said container includes a hanger bar supported by said housing within said chamber and adapted to have said container passed therethrough so that said channel is substantially parallel to said hanger bar, and said means enabling pre-pressurizing of said container includes a spring arm having a first arm portion adapted to be inserted through said channel and a second arm portion adapted for releasable connection to said housing so as to bias said container about said hanger bar in a manner to pressurize the contents within said container.

* * * * *